(12) United States Patent
Gros Daillon (10) Patent No.: US 8,485,721 B2
(45) Date of Patent: Jul. 16, 2013

(54) EX-REACTOR TWO-PHASE TRANSIENT NUCLEAR CALORIMETER

(75) Inventor: Luc Gros Daillon, Brie et Angonnes (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 455 days.

(21) Appl. No.: 12/739,712

(22) PCT Filed: Oct. 24, 2008

(86) PCT No.: PCT/EP2008/064424
§ 371 (c)(1),
(2), (4) Date: Apr. 23, 2010

(87) PCT Pub. No.: WO2009/053456
PCT Pub. Date: Apr. 30, 2009

(65) Prior Publication Data
US 2010/0309948 A1 Dec. 9, 2010

(30) Foreign Application Priority Data
Oct. 26, 2007 (FR) ..................................... 07 58626

(51) Int. Cl.
*G01T 1/167* (2006.01)
*G01T 1/12* (2006.01)
*G01K 17/00* (2006.01)

(52) U.S. Cl.
USPC ............... 374/31; 374/141; 422/51; 436/147

(58) Field of Classification Search
USPC .................... 374/31, 141; 422/51; 436/147
See application file for complete search history.

(56) References Cited

U.S. PATENT DOCUMENTS

| 3,826,921 | A | | 7/1974 | Wallin et al. |
| 4,295,934 | A | * | 10/1981 | Robin ........................... 376/203 |
| 4,393,025 | A | | 7/1983 | Leyse |
| 4,762,423 | A | * | 8/1988 | Basta .............................. 374/31 |
| 5,521,095 | A | * | 5/1996 | Wojciechowski et al. ...... 436/34 |
| 6,273,604 | B1 | * | 8/2001 | Hemmerich et al. ........... 374/45 |
| 2005/0111519 | A1 | | 5/2005 | Eigler et al. |

FOREIGN PATENT DOCUMENTS

| EP | 0275042 A2 | 7/1988 |
| FR | 2170795 A1 | 9/1973 |
| FR | 2516237 A1 | 5/1983 |
| FR | 2603987 A1 | 3/1988 |
| JP | 63-187145 A | 8/1988 |
| WO | WO 99/01729 A | 1/1999 |

OTHER PUBLICATIONS

International Search Report for PCT/EP2008/064424 dated Dec. 19, 2008.

(Continued)

*Primary Examiner* — Christopher Fulton
(74) *Attorney, Agent, or Firm* — Nixon Peabody LLP (57) ABSTRACT

A device to measure the residual power of a charge, comprising: means delimiting a first vessel to receive and contain a charge to be measured; means delimiting a second vessel around the first vessel; means to apply a layer of liquid or wet layer around the first vessel; and means to maintain constant the temperature and/or pressure of a vapor outside the first vessel or in the second vessel.

27 Claims, 2 Drawing Sheets

OTHER PUBLICATIONS

French Preliminary Search Report for FR 0758626 dated Jul. 17, 2008.

Maeda, S. et al., "Decay Heat of Fast Reactor Spent Fuel," Journal of Nuclear Science and Technology, vol. 2, Aug. 1, 2002, pp. 1101-1104.

European Search Report in European Application No. 10169253.1, dated Dec. 22, 2010.

International Preliminary Report on Patentability in International Application No. PCT/EP2008/064424, dated Feb. 9, 2010.

* cited by examiner

EX-REACTOR TWO-PHASE TRANSIENT NUCLEAR CALORIMETER

CROSS REFERENCE TO RELATED APPLICATIONS OR PRIORITY CLAIM

This application is a national phase of International Application No. PCT/EP2008/064424, entitled, "Ex-Reactor Two-Phase Transient Nuclear calorimeter", which was filed on Oct. 24, 2008, and which claims priority of French Patent Application No. 07 58626, filed Oct. 26, 2007.

TECHNICAL AREA AND PRIOR ART

The area of the invention relates to measurement of the residual power of charges, notably of nuclear type.

In particular, it can be used to measure power dissipation in a nuclear charge with a short response time to monitor decay kinetics, optionally by separating the measurement of γ activity.

It applies to all irradiated fuels, or to any other charge whether nuclear or non-nuclear.

At the current time, the size of heat extraction and ionizing radiation protection systems, in particular for irradiated fuels, are built with large margins through poor knowledge of residual power, notably related to uncertainty as to the kinetics of irradiation.

Present evaluations are therefore made using specialized predictive digital instrumentation, with large margins for uncertainty, leading to cumbersome and costly devices in particular with respect to transport.

The irradiation of nuclear fuel transmutes the original material into various unstable nuclei, radioactive isotopes, which deexcite after being irradiated by radiation emission and dissipate power, dissipation depending on the type of fuel and its extent of irradiation, and this power known as residual power needs to be known with sufficient percentage accuracy for the sizing of power evacuation systems and optionally of radiation protection systems.

Depending on the quality of irradiation monitoring, current digital instrumentation reaches accuracy in the order of ten percent with known irradiation, an accuracy which strongly declines in relation to uncertainty regarding irradiation kinetics. This decline is highly detrimental, in particular for protection against ionizing radiation.

Additionally, the results of the digital instrumentation used must be qualified by comparison with measurements of quality.

The problem therefore arises of finding a device and method with which to take the necessary measurements, with accuracy that is better than obtained using numerical calculation.

Another problem relates to the time period over which the measurements must be taken.

Measurements are effectively required for one same charge both after a few minutes, the time needed to prepare measurement and after which residual power can still be high e.g. in the order of a few hundred watts, its decay kinetics also remaining high, and after several months after which residual power is much lower e.g. in the order of a few watts.

Over sufficiently long time periods, the range of measurement is therefore very extensive, in the order of factor one hundred, requiring the use of measurements with large dynamics having sufficient accuracy, or of several measurement systems in cascade, or optionally of a measuring device with several functioning modes all of which must remain reliable for long periods (one year), the necessary accuracy being in the order of one percent for instantaneous residual power.

Said measuring device must preferably therefore have a short response time, in the order of a few seconds, and must therefore have low thermal inertia.

Also, the problem arises of providing a device to measure the residual power of fuels, according to their type and type of irradiation, to allow the size, complexity and cost of their protection systems to be minimized.

Various categories of calorimeters are known.

In "adiabatic" calorimeters, suitable for closed systems, the temperature of the thermostat is servo-controlled by the temperature of the sample, with cancellation of heat exchanges.

In "diathermal heat flow" calorimeters which, with differential assembly, are suitable for open systems, the temperature of the sample follows the temperature of the thermostat through low heat resistance (phase change calorimeters come under this category).

In "diathermal power compensation" calorimeters, the temperature of the sample is servo-controlled by the temperature of the thermostat, by power compensation that is generally electric, with cancellation of heat exchanges.

In "isoperibol" calorimeters (isothermal periphery), there is no particular coupling between the temperature of the sample and the temperature of the thermostat which is most often constant.

Documents FR 2 170 795 and FR 2 603 987 each describe a device applying the flowmeter method i.e. measurement of heat flux using a temperature difference set up through a heat resistance. This method is highly sensitive to the thermal properties of the material used, these properties also having to be constant in time and space. This method is also very sensitive to the various contact resistances used which are difficult to control.

DISCLOSURE OF THE INVENTION

The invention firstly concerns a device to measure the residual power of a charge, comprising:

means delimiting a first vessel to receive and contain a charge to be measured, means delimiting a second vessel around the first vessel, means to apply a layer of liquid or a wet layer, e.g. of thickness less than 1 mm or 2 mm, around the first vessel, means to maintain constant the temperature and/or pressure of a vapour outside the first vessel or in the second vessel.

With this structure of a device according to the invention, it is notably possible to ensure radial heat conduction, from the walls of the first vessel, and hence from the liquid layer or wet layer, into the space separating it from the second vessel.

One embodiment of a device according to the invention is of diathermal heat flow type. Another embodiment is of diathermal type with power compensation.

Said device may further comprise means to measure a temperature and/or pressure on the means delimiting the first vessel and/or in the second vessel.

According to one particular embodiment, this device further comprises:

means to cause a heat transfer fluid to circulate in a condensation circuit, in the second vessel, means to control the flow of the heat transfer fluid to cause this flow to vary in said circuit, in relation to the measurement of temperature and/or pressure on the means delimiting the first vessel and/or in the second vessel.

In addition, means can be provided to maintain constant the input temperature of a heat transfer fluid into said condensation circuit.

Said device may further comprise means, at the input and output of the condensation circuit to measure the input and output temperature of a heat transfer fluid.

According to another embodiment, a device according to the invention comprises a sonic nozzle. It may then also comprise an electric resistance intended to be immersed in a liquid phase.

Means can be provided to measure variation in the power supplied to said electric resistance.

Said device may advantageously further comprise means in the liquid phase to recycle a vapour extracted by the nozzle.

The means to apply a wet layer preferably comprise a sheet in fibrous or porous material.

A device according to the invention may be provided with a layer or volume of liquid intended to supply means applying a liquid layer or wet layer around the first vessel. Overall, the volume of liquid is preferably 20% even 10% less than the total volume of the second vessel.

The application of a liquid layer or wet layer around the first vessel also allows its wall to be maintained at a temperature close to ambient temperature, which can be 20° C. or substantially close to 20° C.

Finally, the volume delimited by the second vessel is previously subjected to pumping to remove a maximum quantity of impurities from the device.

The invention also concerns a device to measure the residual power of a charge comprising:

means delimiting a first vessel to receive and contain a charge to be measured, means delimiting a second vessel around the first vessel, first means forming a heat exchanger, to be applied on or close to a charge to be measured, second means forming a heat exchanger, to be applied to the means delimiting said first vessel.

Said device may also comprise a tube or cladding to insert the charge to be measured, the first means forming a heat exchanger being applied to, or contained in, this tube or cladding.

Each of the first and second means forming a heat exchanger may comprise a pump, a flowmeter, means to impose the input temperature of a heat transfer fluid in said heat exchanger forming means, and means to measure the input and output temperature of the heat transfer fluid.

The invention also concerns a method to measure the residual power of a charge, using a device of the invention such as just described according to any of the above embodiments or such as described in more detail below.

The invention therefore also concerns a method to measure the residual power of a charge comprising:

inserting, in a first vessel, a charge to be measured, this first vessel being contained in a second vessel, applying a liquid layer or wet layer, having a thickness of less than 1 mm or 2 mm for example, around the first vessel, maintaining at constant value the temperature and/or pressure of a vapour outside the first vessel or in the second vessel.

The presence of a liquid layer or wet layer around the first vessel notably allows the ensuring of radial heat conduction from the wall of the first vessel, and hence from the liquid layer or wet layer, into the space separating it from the second vessel. Said method may further comprise a step to measure a temperature and/or pressure on, or against, the first vessel and/or in the second vessel.

According to one embodiment, said method comprises:

circulation of a heat transfer fluid in a condensation circuit, in the second vessel, variation in the flow rate of the heat transfer fluid, in said condensation circuit, in relation to the measurement of temperature and/or pressure on or against the first vessel and/or in the second vessel.

The input temperature of the heat transfer fluid in said condensation circuit can be maintained constant.

Advantageously, at the input and output of the condensation circuit, the input and output temperature of the heat transfer fluid is measured.

According to another embodiment, the heat produced by the charge is extracted via a sonic nozzle at constant flow rate.

An electric resistance can be supplied by a power source, being immersed in a liquid phase; the variation in power supplied to said electric resistance is then measured.

The invention also concerns a method to measure the residual power of a charge comprising:

placing in a first vessel a charge to be measured, this first vessel being contained in a second container, applying a first circulation of heat transfer fluid on or close to the charge to be measured, applying a second circulation of heat transfer fluid on the means delimiting said first vessel.

According to one embodiment of the invention, the following steps are carried out:

the nuclear charge is inserted in a sealed absorbing shield, the assembly is placed in a water/vapour vessel at saturation temperature or set pressure, the outer surface of the shield is supplied with liquid water from a reserve at the bottom of the vessel, via a capillary structure, the heat is extracted from the shield by evaporation, and from the vessel via a sonic nozzle or by the secondary flow of an inner condenser, by adjusting the flow rate to maintain constant the surface temperature of the shield.

The enthalpy balance of the secondary flow is the image of the instantaneous residual power.

The measuring technique used by a device or method according to the invention is of calorimetric type.

With the invention, it is possible to take accurate measurements over a large power range and with a short response time, to monitor any decay kinetics; it can be adapted to any type of nuclear charge (geometry, power, kinetics . . . ).

DETAILED DESCRIPTION OF PARTICULAR EMBODIMENTS

In the three embodiments which will be described, a charge 2, for example a nuclear charge, is placed in a measuring device globally designated under reference 1. Said charge is often in the form of a very elongate cylindrical rod possibly having a length of up to 500 mm for a diameter of around 10 mm. Other dimensions are possible in which case the size of the device is adapted accordingly.

The charge 2, whose residual power decay kinetics are to be measured, is packaged in a metal enclosure 4 also called a shield of known geometry. Preferably, this enclosure extends along an axis of symmetry XX'. It may be of cylindrical shape.

The shield 4 is itself arranged in a primary vessel 11 delimited by a first wall 12, itself arranged in a vacuum vessel 13 protected by an insulating layer 14 and by a thermal radiation reflector 16 (to protect against external radiation of the device 1). The wall 12 may also have axis XX' as axis of symmetry. It may also be of substantially cylindrical shape.

The length of this shield 4 can be around 500 mm for a diameter of around 55 mm. It may be in machinable tungsten alloy but also in another absorbing material such as lead, either single block or multilayer, to reduce costs. For application to nuclear fuels, a tungsten alloy is advantageous since it has strong linear absorption, so that it is possible to limit the thickness of the shield. In addition, its high thermal conductivity promotes isothermy of the device, making it possible to limit inertial storage of energy.

A first embodiment of the invention will be described with reference to FIGS. 1A (side view) and 1B (cross-sectional view along plane AA'). It is a calorimeter of diathermal heat flow type.

This first embodiment firstly comprises an identical structure to the one just described above.

Also, a sheet of liquid 10 (preferably water, but another liquid can be used such as a Freon) is arranged under the shield 4 at a certain distance away from it (a few centimeters). In the structure shown in FIGS. 1A and 1B, the sheet of water is added to the device during its manufacture (in fact: in vessel 11) before any operational use thereof. In addition, the vessel 11 is previously placed under a vacuum to remove as many impurities as possible which may perturb measurement. The inside of the device is sealed so that no evaporation of water to outside the device is possible.

In general, a quantity of liquid is placed in the device that is sufficient to wet the means 6 (described below) whilst not wetting the shield 4. The shield is not immersed in water but a film of water or liquid is created on its surface by means 6. The volume of this quantity of liquid is preferably less than 20% and further preferably greater than 1% of the total volume of the primary vessel 11 delimited by the vessel 12. In principle, a quantity of liquid in the order of a few % of the volume of the vessel 11 may be sufficient, but consideration must be given to some imperfections of the system, notably possible imperfect horizontality. On this account, it is preferable to add a percentage of liquid of more than 1% or a few % to guarantee wetting of means 6 at all times.

When in operation, the device is arranged so that the wall of the shield 4, preferably its axis of symmetry, and the surface of the sheet of water lie substantially parallel to each other, for example at a distance d from each other of between 5 cm and 10 cm or 20 cm. In other words, the device, or shield 4, is then arranged substantially horizontally on a support 33 or any type of means forming a support or bearing for the device.

Means 6 will allow at least part of this water or liquid to be conveyed up against the periphery of the shield 4. The heat, released by the shield produced by the charge 2 it contains, allows vaporization of at least part of the water brought against the periphery of the shield.

These means 6 form a capillary structure for example around the shield 4 or a capillary skin around this shield. Said structure can supply the outer surface of this shield with water at sufficient flow rate for the maximum power to be extracted (e.g. for 300 W maximum power, around 0.12 g/s of water is pumped and distributed on the surface around the shield 4). These means 6 comprise a layer in fibrous or porous or rough material for example, which is arranged firstly to be in contact with the reserve of water 10 located at the bottom of the reservoir (it dips in this water, see FIG. 1B), and secondly to be wrapped round the side walls of the shield 4 (or at least the walls of this shield which are parallel to the axis of symmetry XX'). It is also possible to use a liquid circuit supplied by a pump, but the presence of a pump in the device would contribute energy to the device itself and would perturb the measurements it is desired to carry out which need to be very accurate.

In this manner, a layer of water or moisture of millimetric or sub-millimetric thickness is created around the shield 4. The thickness of this layer is less than 1 mm or 2 mm for example.

With this structure, it is possible to obtain radial heat conduction from the shield 4 to the space separating it from the wall 12.

The liquid film thus formed around the first vessel allows a surface temperature of the shield 4 to be imposed, by evaporation, and is scarcely sensitive to local heat flux contrary to the presence of a mass of water around the shield 4 which, even at regulated temperature, cannot extract a strong heat flux without a large difference in temperature. In a device according to the invention, this uniform temperature on the surface of the shield 4 allows a short response time to be obtained and low energy storage $\gamma$ in the shield, despite its high thermal inertia, by means of heat conduction that is exclusively radial, hence over a short length.

Preferably, the surface temperature of the shield is imposed at a value very close to ambient temperature, i.e. at a temperature of between 18° C. and 20° C. (or even outside this range) which allows heat losses to be strongly limited. On the other hand, the temperature in volume 11 may vary with respect to ambient temperature. It is possible to correct the heat balance to take these conditions into account.

In this manner, a kind of second isothermal vessel is formed, which also allows heat losses to be limited by adjusting its temperature to ambient temperature in particular.

The pressure prevailing in the volume 11 is then fixed by the filling level of the liquid in this volume and by temperature.

According to the invention, to evaporate a liquid film around the shield 4 is very advantageous, in particular compared with a technique which consists of immersing the shield 4 in a liquid, the low operating pressure leading to a very large volume of liquid and vapour mixture (inflated level).

At the top of the shield 4, there are arranged condenser-forming means 8 in which a heat transfer fluid can circulate. These condenser means, for example a circulation loop of heat transfer fluid, will allow condensation of the water present in vapour form in the vessel, which has been vaporized as explained above.

In these condenser means, the heat transfer fluid will circulate at a flow rate of between a few fractions of a gram per second for example and around 10 g per second.

The surface of this condenser 8 and the maximal flow rate of the heat transfer fluid are adapted to extract maximum power, at an input temperature of the heat transfer fluid imposed by a cryostat.

According to one preferred embodiment, over-sizing of the surface of the condenser 8 allows the output temperature of the heat transfer fluid to be maintained at a value close to the saturation temperature in the vessel 11.

Preferably, the difference between the temperature of the heat transfer fluid when it enters the condenser means 8 and its temperature when it leaves these condenser means is reduced to a minimum compatible with the accuracy of its measurement. Typically, when in use, the difference between the input temperature of the fluid in the means or circuit 8 and its output temperature is around 10° C.

The thermal power is therefore extracted from the vessel 11 by the secondary liquid flow of the condenser whose enthalpy flow is the image of instantaneous residual power.

After condensation, the water will fall under gravity to the bottom of the reservoir, which will make it possible to maintain a substantially constant water level 10. The inside of the vessel is designed so that the water does not fall directly on the shield but into the liquid bottom 10.

At least one measurement of temperature and/or pressure of the atmosphere in the primary vessel 11 can be taken, using a temperature sensor and/or a pressure sensor arranged in this primary vessel.

It is preferable however, for better accuracy, to measure the temperature directly on the walls of the shield 4. In this case, a temperature probe 17 is applied to these walls. This probe is preferably a platinum probe with accuracy of $1/100°$ C.

The data on temperature and/or pressure, for example temperature data given by the probe 17, is sent to control means 19 controlling a pump 18 for example a variable speed positive displacement pump located outside the device 1. According to one example, the pump is driven by a high frequency stepping motor.

This pump 18 is used to regulate the flow rate of the heat transfer fluid circulating in the condenser means 8, to maintain the measured temperature and/or pressure constant. The circulation circuit for the heat transfer fluid also comprises a flowmeter, a cryostat 30 imposing the input temperature of the heat transfer fluid into the condenser means 8, and means 32, 34 for temperature measurement at the input and output of the condenser. Preferably, the flowmeter is of "Coriolis" type.

With respect to the example of a probe 17, this probe together with the flow regulation means will allow the walls of the shield 4 to be maintained isothermal and at constant temperature. Measurement of temperature or measurement of pressure in the volume 11 would lead to maintaining these parameters constant during measurement.

The value of the temperature and/or of the pressure measured inside the vessel 11 or on the walls of the vessel 4, is such that the atmosphere surrounding the shield 4 is maintained at low pressure in the order of a few tens of mbar, for example 26 mbar, so that the water 10 is able to boil at low temperature or at ambient temperature for example substantially at 22° C., or less than 30° C.

Adjustment of the temperature conditions of the vessel 11 to a value close to ambient temperature also allows heat losses to be minimized.

Inertial storage is minimized by the isothermy of the surface of the shield 4, by use of a heat conductive material for the walls of this shield, and by the regulation or control of the surface temperature of the shield 4, or of the temperature and/or pressure in the vessel 11, this regulation or control obtained by means of the secondary flow of heat transfer fluid in condenser 8.

This device, for a cylindrical nuclear charge 10 mm in diameter and 500 mm in length, with a maximum power of 260 W and minimum power of 4 W, guarantees a minimum time of 30 s for 1% decay and evaluation of instantaneous residual power to within less than 1% over the entire measurement range for six months. In addition, the response time of said device is very short, less than 20 seconds or than 10 seconds. This response time corresponds to the time needed to measure a certain variation in power which occurs almost instantaneously (step function) inside the device.

In this example of embodiment, the minimum quantity of water to be placed in the volume 11 is around 1% of this volume 11. This volume is about 4 l, the minimum volume of liquid is therefore about 40 cm$^3$, making it possible to wet the capillary system 6 whilst not wetting the shield 4. To offset any horizontality defects, it is chosen to add a percentage of liquid greater than 1% i.e. around 300 cm$^3$ in this example. The ambient temperature is in the order of 20° Celsius, and since the temperature of the wall 4 is maintained as close as possible to ambient temperature, the resulting pressure prevailing in the volume delimited by the vessel 11 is around 20 mbar absolute. For the heat balance, it is considered that the heat losses in this example are in the order of 85 mW/K.

In general, with said device according to the invention, it is possible to measure the heat balance of the system by the flow rate of the heat transfer fluid. The power to be measured is effectively directly related to the flow rate of the heat transfer fluid, to its input temperature in the condenser means 8 and to its output temperature from these means 8. Since these two temperatures are maintained more or less constant, and are measured, it remains to measure the flow rate to obtain the residual power of the charge 2.

One example of data processing which can be applied by computing means, not shown in the figure, is as follows:

conversion of the measured electric magnitudes (temperature, flow rate) into representative physical magnitudes taking into account the transfer function of the sensors, optionally, controlling coherency criteria, such as redundancy, evaluating instantaneous residual power, using the enthalpy balance of the secondary flow in the condenser, including that of heat losses and inertial storage, with propagation of associated uncertainty.

In this device, the residual power of the charge is extracted by the mass flow of the secondary flow of the condenser 8. The input temperature of the heat transfer fluid can be maintained constant by a cryostat; the flow of the heat transfer fluid can therefore be regulated to maintain constant the temperature and/or pressure in the vessel 11 or on the walls of the shield 4.

With this embodiment, it is possible to measure all the contributions to residual power, irrespective of the contribution by radiations $\alpha$ and $\beta$, or the contribution of $\gamma$ radiation.

Figure 2:
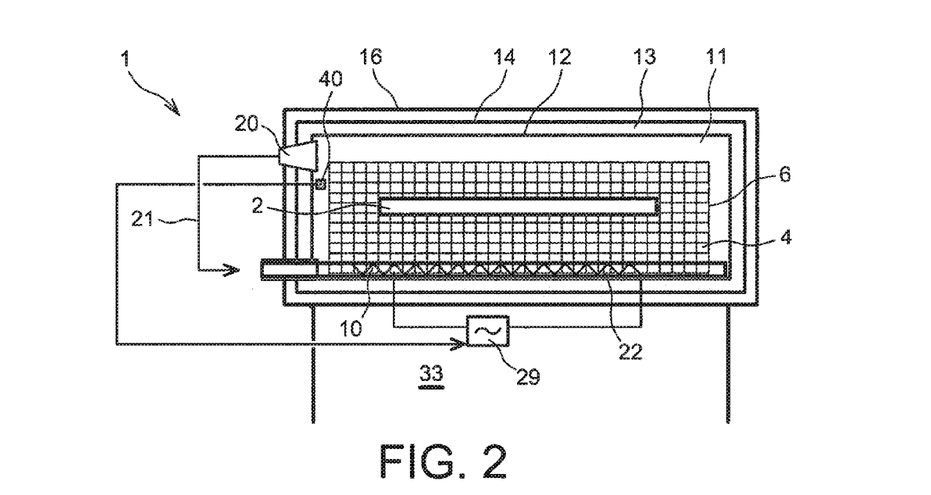
FIG. 2 illustrates a second embodiment of the invention.

Another embodiment of the invention is illustrated in FIG. 2. It concerns a calorimeter of diathermal type with power compensation.

Figure 1A:
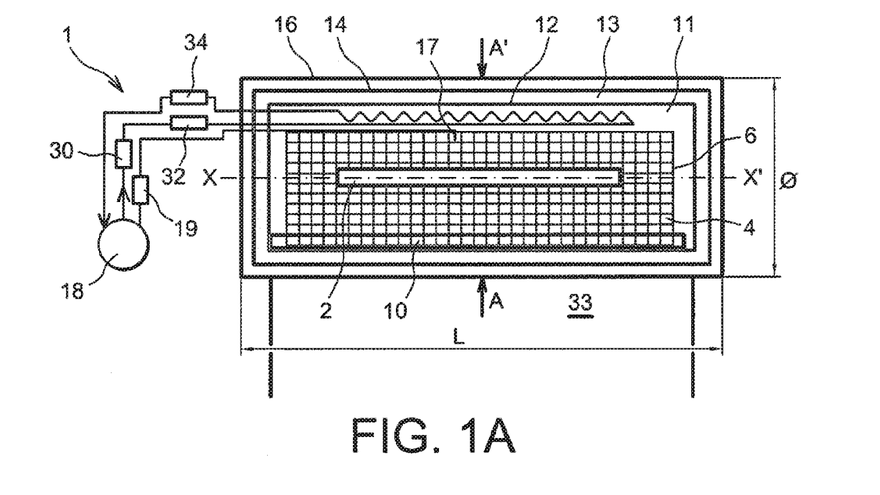
FIGS. 1A and 1B illustrate a first embodiment of the invention.
Figure 1B:
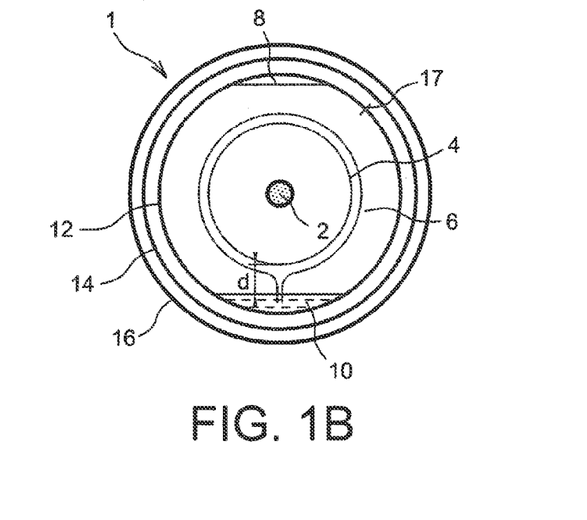

Number references identical to those in FIG. 1A designate identical or similar elements.

Therefore, in addition to the shield or shield 4, there is a capillary structure 6 which allows a layer of moisture to be formed around this shield, and the sheet of water or liquid 10. The remarks already made above notably apply to this moisture layer (function, thickness, volume as a percentage of the volume of the vessel 11), to the capillary structure 6 and to the sheet of liquid 10 which is also present. Before filling with water, a vacuum is set up in the device.

Here again, when in operation, the device is arranged so that the wall of the shield 4 and the surface of the sheet of water lie substantially parallel to each other, separated for example by a distance of between 5 cm and 10 cm or 20 cm. In other words, the device is then arranged substantially horizontally on the support-forming means 33.

In this embodiment, measurement is made with constant global power.

The device comprises a sonic nozzle 20 which will be used to extract heat at a constant flow rate. The heat is in fact extracted by a vapour mass flow through the nozzle 20.

The extracted heat is calibrated, at constant extracted power, slightly greater than the maximum residual power.

The pressure inside vessel 12 is kept constant during decay of the residual power, by annex vapour generation due to the power dissipated by a compensating electric resistance 22 immersed in the liquid phase 10. The instantaneous residual power of the charge 2 is the difference between the constant enthalpy power of the nozzle and that of the compensating electric resistance. As a variant, it is also possible to seek to maintain the temperature of the vapour constant in the vessel 11, or the temperature of the shield 4, using a probe such as probe 17 already described above. However, it is more practical to work at constant pressure in vessel 11.

The variation in power is supplied to the compensating resistance 22 by voltage or current regulating means 29, themselves controlled by the pressure of the two-phase vessel which remains constant. Pressure is measured in the vessel by a sensor 40 and the variation in power gives the variation in power of the charge 2 for a given vessel pressure. The critical nozzle 20 provides a mass flow known from calibration, hence an enthalpy power Pe (product of mass flow Dm times the latent heat of vaporisation Cv), and the residual power is equal to the enthalpy power Pe of the nozzle less the electric power Pél of the compensating resistance 22.

Here again, processing of measurement data can be carried out by computing means not shown in the figure.

Said means can be used to calculate the residual power Pr as per the indications given above:

$$Pr = Pe - Pél$$

$$Pe = Dm \times Cv.$$

For low total dissipated energies, low residual power or short times, this embodiment can have lost water functioning with adapted initial water content.

For high total dissipated energies, the vapour extracted by the nozzle 20 can be recycled in water and re-injected into the liquid phase 10. For example the vapour is condensed in an external cryostat and re-supplies the water reserve 10 of the vessel 12 by injection under gravity, at the bottom of the device. In other words, in this embodiment, the vapour is extracted from the device but can be condensed outside the device (see arrow 21 in FIG. 2), and re-injected into the device.

The characteristics and notably the response time and accuracy are the same as already indicated above.

Figure 3:
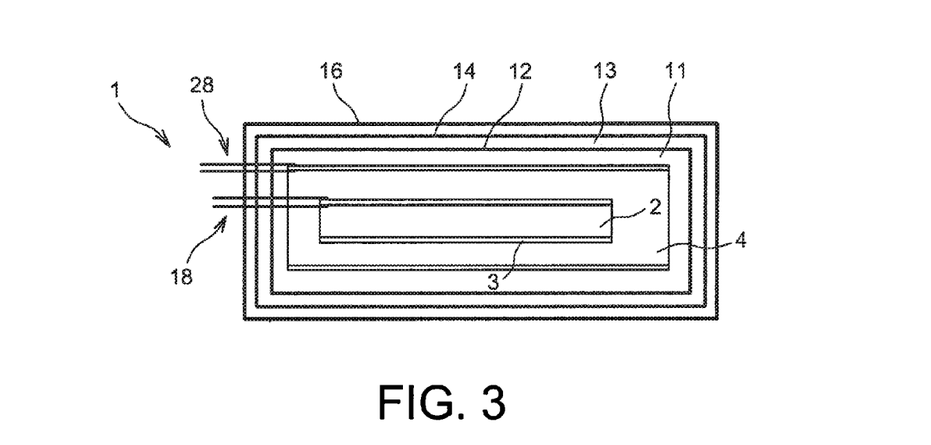
FIG. 3 illustrates a third embodiment of the invention.

Another embodiment of the invention is illustrated in FIG. 3. Identical number references to those in the preceding figures designate identical or similar parts.

For reasons of protection against ionizing radiation, it may be advantageous to evaluate the contribution made by gamma radiation to residual power.

The measuring device can be adapted accordingly through the use of two systems 18, 28 to extract power from the primary vessel, one for the power dissipated in the rod 2 or directly around it, and the other in the shield 4. The preferred characteristics of symmetry around an axis such as axis XX' in FIG. 1A remain valid. In particular, the shield 4 itself preferably has cylindrical symmetry.

A heat transfer fluid circulates in each of these exchangers.

According to one embodiment, for each exchanger, the input temperature and output temperature of the heat transfer fluid are measured and kept constant, and the flow of each liquid is regulated. In other words, the fluid circulation circuit of each exchanger comprises a pump which regulates fluid flow, a flowmeter, a cryostat to impose the input temperature of the fluid in the measuring device, and temperature measuring means between the input and output of the exchanger.

From the variations in mass flow of the heat transfer fluid in the first exchanger 18, the variation in residual power of the charge 2 is obtained.

From the variations in mass flow of the heat transfer fluid in the second exchanger 28, the variation in that part of residual power of the charge 2 due to γ radiation can be obtained.

Means to measure mass flow can therefore be provided for each exchanger.

In some cases, for reasons of practicality and safety, notably if the charge is of nuclear fuel type, the exchanger 18 is not applied directly to the charge 2, but on or in a tube or cladding 3 into which the charge slides into place. The wall, or walls, of this tube or cladding therefore lie as close as possible to the charge.

Exchanger 18 is used to measure the residual powers of alpha and beta activity, and exchanger 28 to measure residual gamma power. These two powers are equal to the products of the mass flows of the corresponding heat transfer fluids, times the enthalpy difference of the water between the output and input.

Here again, processing of measurement data can be made by computing means not shown in the figure.

Said means allow calculation of residual powers, firstly of alpha and beta activity and secondly of gamma activity in accordance with the indications given above.

Measurements and simulations were carried out:

Heat Losses:

The device of the invention is designed to achieve minimal heat losses through its functioning close to ambient temperature and through the use of efficient thermal protections, vacuum vessel with multilayer anti-radiation shield, polyurethane insulation and shield reflecting ambient light. Nonetheless since the powers to be measured may be relatively low, it is sought to characterize heat losses to allow accurate evaluation of power.

Using an electric simulator of the nuclear charge, a device of the type shown in FIGS. 1A and 1B is set in stable operation at a regulated temperature of +5° C. and −5° C. relative to ambient temperature, power off, the temperature of the shield is measured for several hours to monitor its development towards ambient temperature and to define its characteristic time to equilibrium and hence its heat losses.

The measurements indicate that data on shield temperature T can be shown as:

$$(T - T_\infty)/(T_0 - T_\infty) = e^{-\alpha * t}$$

α being the ratio of equivalent heat conduction to the known inertia of the device (7 kJ/K), which leads to a global heat loss of 80 mW/K conforming to predictions.

Measurement of Power:

Since the device is designed to measure a residual power of 260 to 4.5 W, tests were conducted with a device of the type shown in FIGS. 1A and 1B, using an electric simulator of the nuclear charge for stabilized power varying over the entire range, the enthalpy power of the secondary flow of the condenser 8 being compared with the electric power of the simulator. The results show that after taking heat losses into account, results still remain compatible with expected accuracy (+/−1%).

A device conforming to the invention has a short response time, in the order of 10 seconds or less. In addition, great accuracy is ensured to within 1% or less. Finally, a device of the invention can operate over extensive measurement dynamics with a factor of 100 between maximum power and minimum power.

On account of its low heat losses, a device according to the invention is also adapted to the measurement of a minimum power to be measured in the order of 4 W.

The invention claimed is:

1. Device to measure the residual power of a charge, comprising:
   a first vessel to receive and contain a charge to be measured,
   a second vessel around the first vessel,
   a layer to apply a liquid or wet layer around the first vessel,
   a condensation circuit, part of which is in said second vessel, to maintain constant the temperature outside the first vessel and to maintain constant at least one of the temperature and the pressure of a vapour in the second vessel.

2. Device according to claim 1, further comprising a probe to measure at least one of a temperature and a pressure at least on said first vessel or in said second vessel.

3. Device according to claim 2, comprising:
   a pump to cause a heat transfer fluid to circulate in said condensation circuit,
   a control device of the flow of the heat transfer fluid to cause this flow to vary in said circuit, in relation to the measurement of said probe.

4. Device according to claim 3, further comprising a cryostat to maintain constant the input temperature of a heat transfer fluid in said condensation circuit.

5. Device according to claim 3, comprising temperature sensors to measure the input and output temperature of a heat transfer fluid at the input and output of the condensation circuit.

6. Device according to claim 1, said layer to apply a liquid or wet layer comprising a sheet of fibrous or porous or rough material.

7. Device according to claim 1, said second vessel comprising a fluid whose volume is smaller by 20% than the volume of said second vessel.

8. Device according to claim 1, the first vessel being in tungsten or lead.

9. Device according to claim 1, also comprising a thermal insulation layer and a thermal radiation reflector.

10. Device to measure the residual power of a charge, comprising:
    a first vessel to receive and contain a charge to be measured,
    a second vessel around the first vessel,
    a layer to apply a liquid or wet layer around the first vessel,
    a sonic nozzle, to extract heat from an atmosphere contained within the second vessel, and
    a sensor to measure at least one of pressure and temperature.

11. Device according to claim 10, further comprising an electric resistance intended to be immersed in a liquid phase.

12. Device according to claim 11, comprising a recycling circuit to recycle, in the liquid phase, a vapour extracted by the nozzle.

13. Device according to claim 10, further comprising a sensor to measure variation in power supplied to said electric resistance.

14. Device according to claim 10, said layer to apply a liquid or wet layer comprising a sheet of fibrous or porous or rough material.

15. Device according to claim 10, said second vessel comprising a fluid whose volume is smaller by 20% than the volume of said second vessel.

16. Device according to claim 10, the first vessel being in tungsten or lead.

17. Device according to claim 10, also comprising a thermal insulation layer and a thermal radiation reflector.

18. Device to measure the residual power of a charge, comprising:
    a first vessel to receive and contain a charge to be measured,
    a second vessel around the first vessel,
    a first heat exchanger, to be applied on or close to a charge to be measured,
    a second heat exchanger, to be applied to the first vessel, and
    a sensor to measure mass flow of a heat transfer fluid of each exchanger.

19. Device according to claim 18, further comprising a tube or cladding in which to insert the charge to be measured, the first heat-exchanger being applied to, or contained in, this tube or this cladding.

20. Device according to claim 18, each of the first and second heat-exchanger comprising a pump, a flowmeter, a cryostat to impose the input temperature of a heat transfer fluid into said heat-exchanger forming means, and sensors to measure the input and output temperature of the heat transfer fluid.

21. Device according to claim 18 said first vessel being in tungsten or lead.

22. Device according to claim 18, also comprising a thermal insulation layer and a thermal radiation reflector.

23. Method to measure the residual power of a charge, comprising:
    the placing, in a first vessel, of a charge to be measured, this first vessel being contained in a second vessel,
    the application of a liquid layer or wet layer around the first vessel,
    maintaining at constant value at least one of the temperature and the pressure of a vapour outside the first vessel or in the second vessel.

24. Method according to claim 23, further comprising measuring at least one of a temperature or pressure on, or against, said first vessel or in said second vessel.

25. Method according to claim 24, comprising:
    circulating a heat transfer fluid in a condensation circuit, in said second vessel,
    varying a flow of said heat transfer fluid, in said condensation circuit, in relation to said at least one of said temperature or pressure on, or against, said first vessel and/or in said second vessel.

26. Method according to claim 23, heat produced by said charge being extracted through a sonic nozzle at constant flow rate.

27. Method to measure the residual power of a charge, comprising:
    placing, in a first vessel, a charge to be measured, this first vessel being contained in a second vessel,
    applying a first circulation of heat transfer fluid on or close to the charge to be measured by a first heat exchanger,
    applying a second circulation of heat transfer fluid on the first vessel by a second heat exchanger, and
    measuring mass flow of the heat transfer fluid of each exchanger.

* * * * *

UNITED STATES PATENT AND TRADEMARK OFFICE
CERTIFICATE OF CORRECTION

PATENT NO. : 8,485,721 B2  
APPLICATION NO. : 12/739712  
DATED : July 16, 2013  
INVENTOR(S) : Luc Gros Daillon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 457 days.

Signed and Sealed this
Eighth Day of September, 2015

Michelle K. Lee
*Director of the United States Patent and Trademark Office*